United States Patent
Seo et al.

(10) Patent No.: US 10,031,551 B2
(45) Date of Patent: Jul. 24, 2018

(54) WEARABLE ELECTRONIC DEVICE

(71) Applicant: Samsung Electronics Co., Ltd., Suwon-si (KR)

(72) Inventors: Jae-Il Seo, Suwon-si (KR); Ki-Jae Kim, Seoul (KR); Byoung-Uk Yoon, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 204 days.

(21) Appl. No.: 15/017,307

(22) Filed: Feb. 5, 2016

(65) Prior Publication Data

US 2016/0252929 A1 Sep. 1, 2016

(30) Foreign Application Priority Data

Feb. 27, 2015 (KR) .................. 10-2015-0028631

(51) Int. Cl.
*G06F 1/16* (2006.01)

(52) U.S. Cl.
CPC ............ *G06F 1/163* (2013.01); *G06F 1/1635* (2013.01)

(58) Field of Classification Search
None
See application file for complete search history.

(56) References Cited

U.S. PATENT DOCUMENTS

| 6,359,993 | B2* | 3/2002 | Brimhall | H04R 25/456 |
| | | | | 381/322 |
| 6,532,295 | B1* | 3/2003 | Brimhall | H04R 25/608 |
| | | | | 181/130 |
| 7,971,337 | B2* | 7/2011 | Kral | H04R 25/604 |
| | | | | 156/250 |
| 8,693,719 | B2* | 4/2014 | Higgins | H04R 25/602 |
| | | | | 381/322 |
| 8,867,768 | B2* | 10/2014 | Shennib | H04R 25/656 |
| | | | | 381/312 |
| 8,929,559 | B2* | 1/2015 | Splettstoeszer | H04R 25/552 |
| | | | | 29/594 |
| 9,338,569 | B2* | 5/2016 | Moller | H04R 25/60 |
| 2008/0212817 | A1* | 9/2008 | Lommel | H04R 25/608 |
| | | | | 381/323 |
| 2012/0151758 | A1* | 6/2012 | Primavera | A61N 1/3758 |
| | | | | 29/761 |

(Continued)

FOREIGN PATENT DOCUMENTS

KR 2015-0008961 1/2015

*Primary Examiner* — Courtney Smith
*Assistant Examiner* — Rashen E Morrison
(74) *Attorney, Agent, or Firm* — McAndrews, Held & Malloy, Ltd.

(57) ABSTRACT

According to an embodiment of the present disclosure, a wearable electronic device comprises a circuit board including first portions where a plurality of electronic parts are mounted, and second portions arranged between the first portions and rotatably connecting the first portions with each other, and a bracket having a plurality of contact surfaces corresponding to the first portions, wherein the circuit board is coupled to surround at least a portion of the bracket. The circuit board may be coupled to surround at least a portion of the bracket. The wearable electronic device may be implemented in various manners according to embodiments of the present disclosure.

23 Claims, 26 Drawing Sheets

(56) References Cited

U.S. PATENT DOCUMENTS

| | | | |
|---|---|---|---|
| 2012/0224704 A1* | 9/2012 | Splettstoeszer | H04R 25/552 381/23.1 |
| 2014/0111953 A1* | 4/2014 | McClure | G06F 3/044 361/749 |
| 2015/0003654 A1 | 1/2015 | Kim et al. | |
| 2015/0076628 A1* | 3/2015 | Bolognia | B81C 1/00309 257/416 |
| 2015/0256952 A1* | 9/2015 | Naumann | H04R 25/604 381/324 |

\* cited by examiner

WEARABLE ELECTRONIC DEVICE

RELATED APPLICATION(S)

This application claims the benefit under 35 U.S.C. § 119(a) of a Korean patent application filed in the Korean Intellectual Property Office on Feb. 27, 2015 and assigned Serial No. 10-2015-0028631, the entire disclosure of which is incorporated herein by reference.

BACKGROUND

Embodiments of the present disclosure relate to electronic devices, e.g., wearable electronic devices that may be put on a portion of a human body.

Electronic device means a device performing a particular function according to its equipped program, such as a home appliance, an electronic scheduler, a portable multimedia player, a mobile communication terminal, a tablet personal computer (PC), a video/sound device, a desktop PC or laptop computer, a navigation device for automobile, etc. For example, electronic devices may output stored information as voices or images. As electronic devices are highly integrated and high-speed, high-volume wireless communication becomes commonplace, mobile communication terminals are equipped with more functions. For example, an electronic device comes with a plurality of integrated functionalities, including entertainment functions such as playing video games, a multimedia function such as replaying music/videos, a communication and security function for mobile banking, and a scheduling or e-wallet function.

Portable electronic devices, such as electronic schedulers, portable multimedia players, mobile communication terminals, tablet personal computers (PCs), etc., are generally equipped with a flat-type display device and a battery, and may be limited in shape to a bar, clamshell, or slidable shape by their accompanying displays or batteries. As displays and batteries are nowadays made smaller or more compact, the wearable electronic device may be put on the user's wrist, head, or other body portions.

To increase portability or wearability of wearable electronic devices, batteries powering the wearable electronic devices may be required to be more compact and lightweight while presenting a better performance.

The electronic parts and the circuit board in the wearable electronic device may be connected by soldering individual wires or via terminals-attached wires. The separate individual or terminals-attached wires may be an obstacle to making the wearable electronic device more compact. Further, such may result in reduced efficiency of assembling the electronic parts of the wearable electronic device.

The above information is presented as background information only to assist with an understanding of the present disclosure. No determination has been made, and no assertion is made, as to whether any of the above might be applicable as prior art with regard to the present disclosure.

SUMMARY

Thus, according to an embodiment of the present disclosure, there is provided a wearable electronic device that may be made compact by mounting electronic parts on a circuit board.

Further, according to an embodiment of the present disclosure, there is provided a wearable electronic device with an enhanced process of assembling electronic parts.

According to an embodiment of the present disclosure, a wearable electronic device comprises a circuit board including first portions where electronic parts are mounted and second portions arranged between the first portions and rotatably connecting the first portions with each other, and a bracket having contact surfaces corresponding to the first portions. The circuit board may be coupled to surround at least a portion of the bracket.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
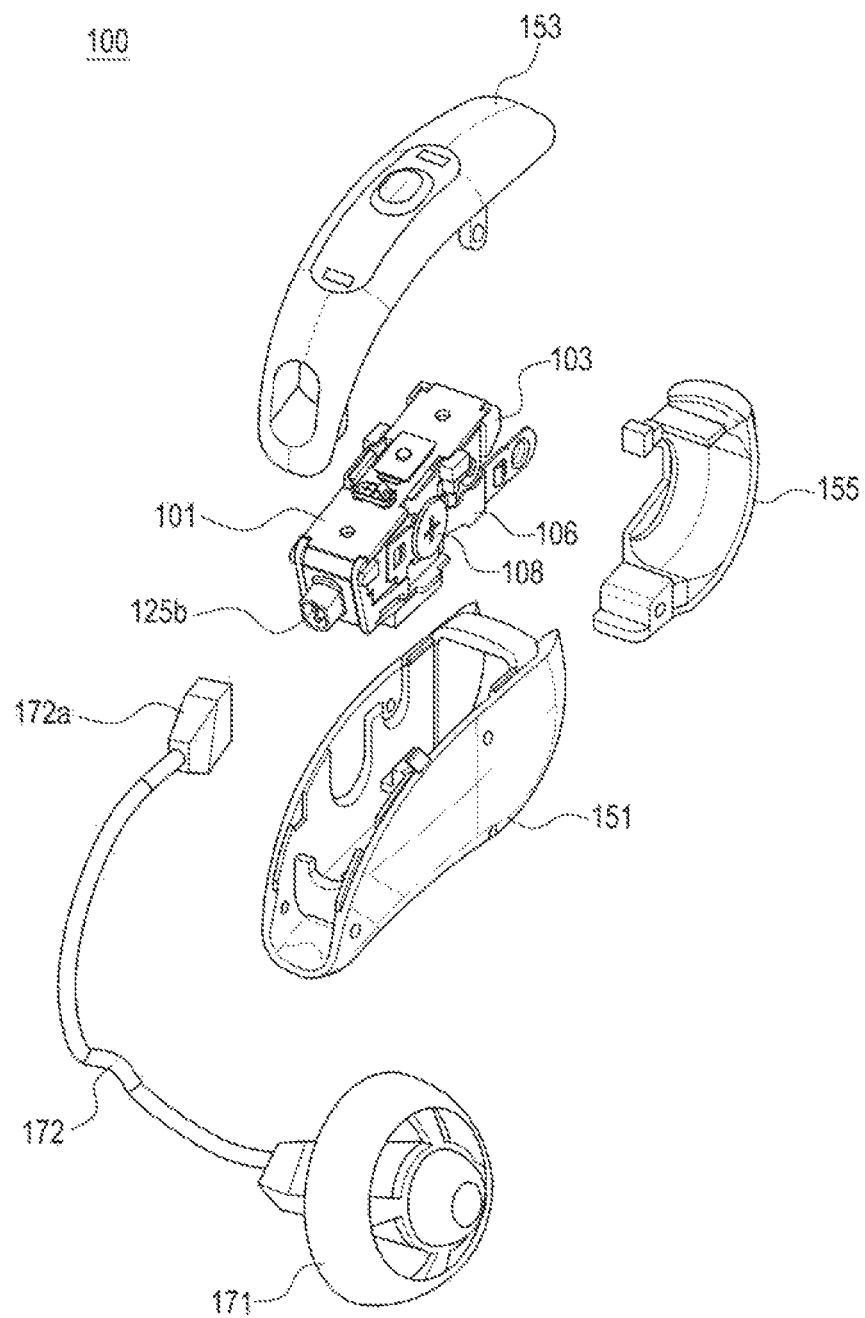
FIG. 1 is an exploded perspective view illustrating a wearable electronic device according to an embodiment of the present disclosure.

Hereinafter, embodiments of the present disclosure are described with reference to the accompanying drawings. However, it should be appreciated that the present disclosure is not limited to the embodiments, all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 2:
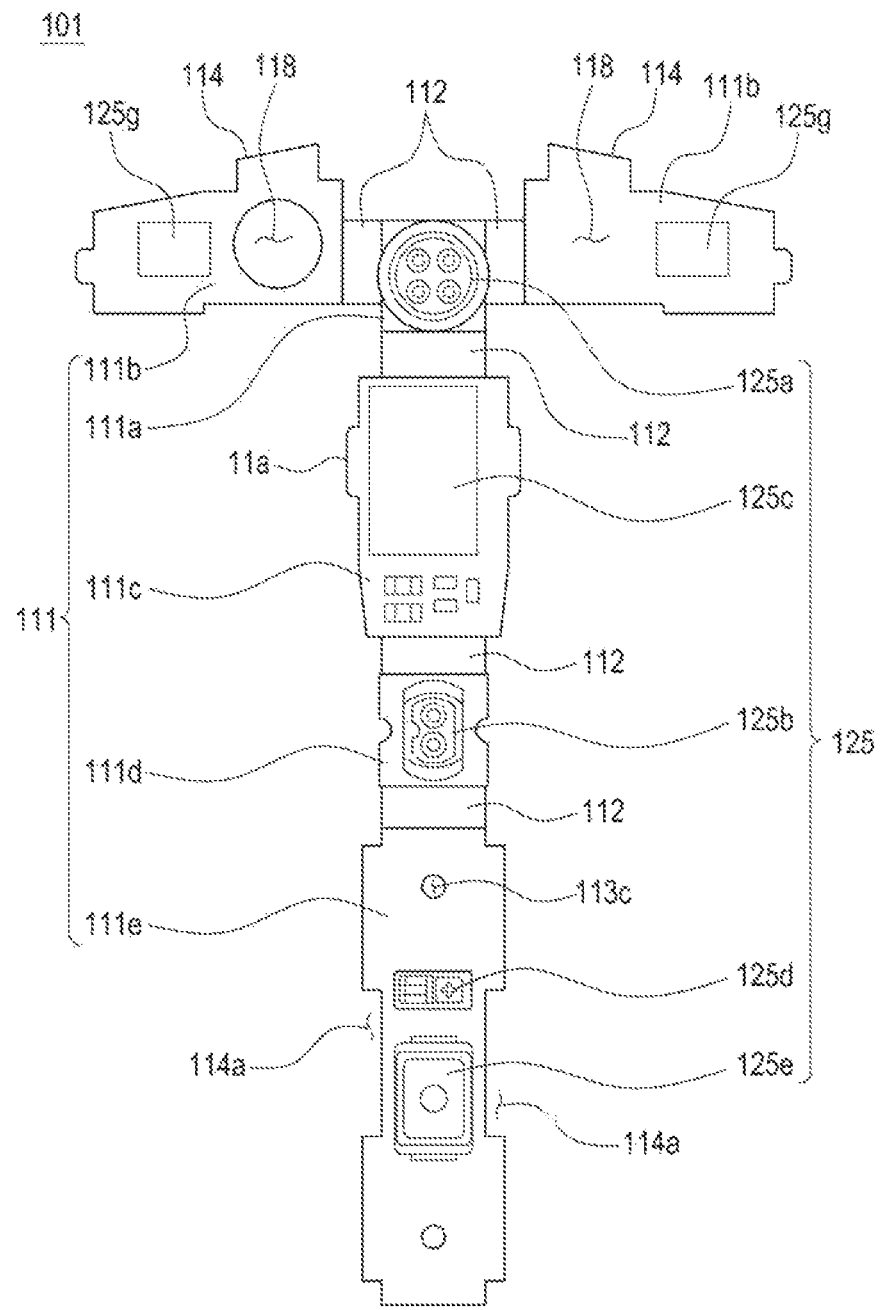
FIG. 2 is a top view illustrating a circuit board as illustrated in FIG. 1.
Figure 3:
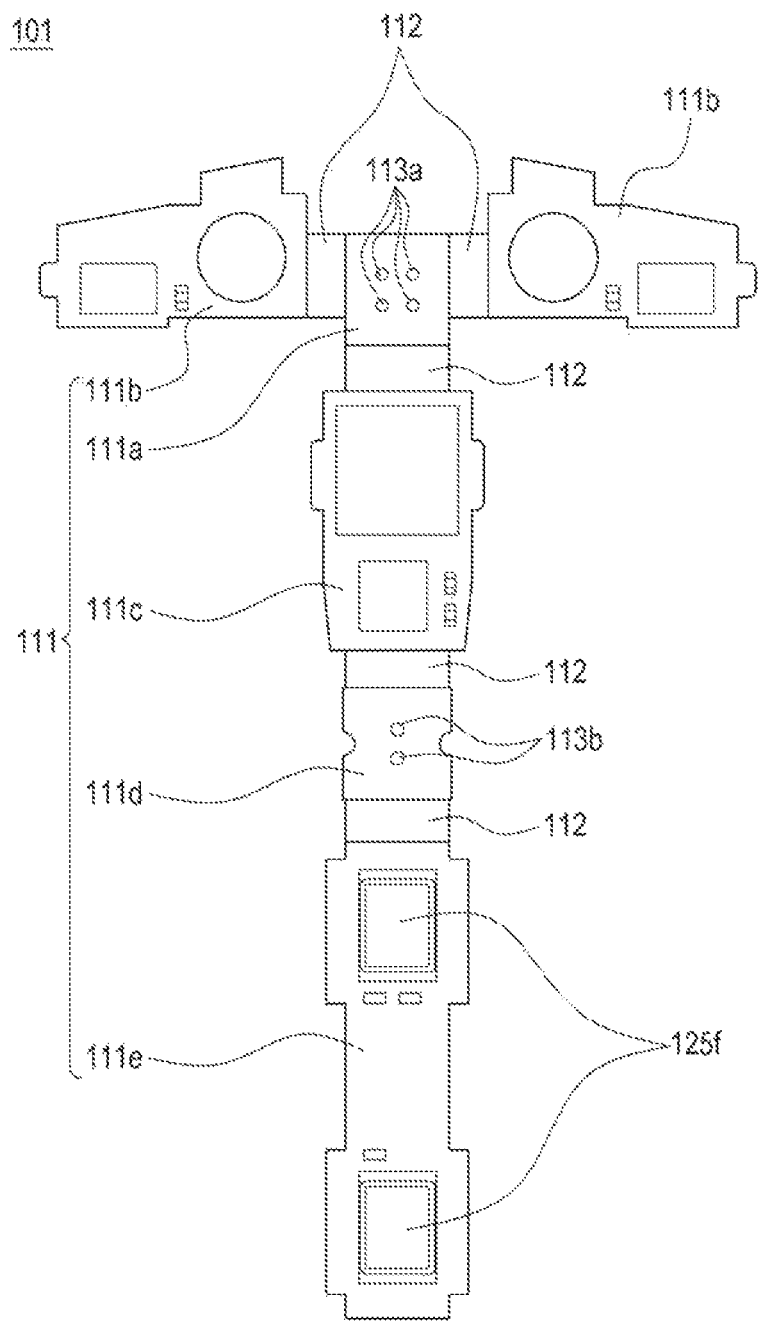
FIG. 3 is a bottom view illustrating a circuit board as illustrated in FIG. 1.
Figure 4:
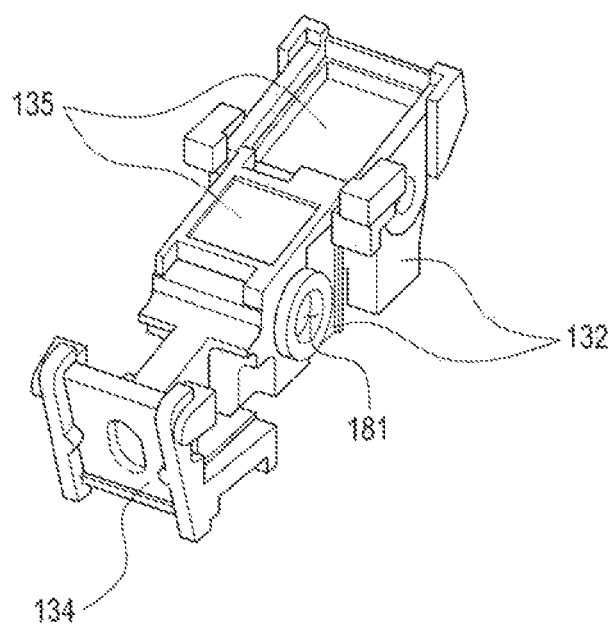
FIG. 4 is a perspective view illustrating a bracket as illustrated in FIG. 1.
Figure 5:
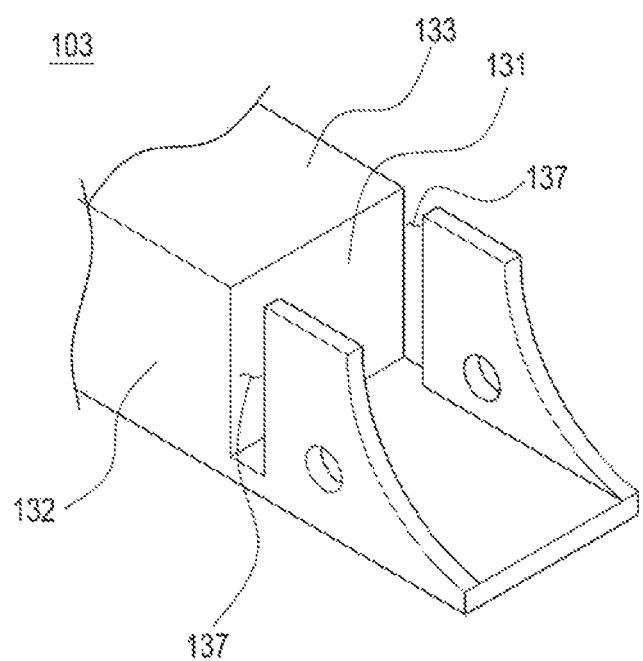
FIG. 5 is a perspective view illustrating slits and contact surfaces of a bracket as illustrated in FIG. 1.

FIG. 1 is an exploded perspective view illustrating a wearable electronic device according to an embodiment of the present disclosure. FIG. 2 is a top view illustrating a circuit board as illustrated in FIG. 1. FIG. 3 is a bottom view illustrating a circuit board as illustrated in FIG. 1. FIG. 4 is a perspective view illustrating a bracket as illustrated in FIG. 1. FIG. 5 is a perspective view illustrating slits and contact surfaces of a bracket as illustrated in FIG. 1.

According to an embodiment of the present disclosure, the wearable electronic device may include at least one of an auditory device, an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device (e.g., an implantable circuit). The auditory device may be an earphone, headphone, or a hearing aid that assists the hearing impaired in hearing sounds. Now described are embodiments in which the wearable electronic device is an auditory device, for example.

Referring to FIGS. 1 to 5, the wearable electronic device 100 may include a circuit board 101 and a bracket 103, according to an embodiment of the present disclosure.

The circuit board 101 may include first portions 111 which may include a first board 111a, a second board 111b, a third board 111c, a fourth board 111d, and a fifth board 111e where a plurality of electronic parts may be mounted, and second portions 112 positioned between the first portions 111 to rotatably connect the first portions 111. The electronic parts may include at least one of a first connector 125a, a second connector 125b, an integrated circuit (IC) chip 125c, a contact terminal 125d, a switching device 125e, and contact pads 125g. The first connector 125a and the second connectors 125b may include a first connector 125a to which an external data cable (not shown) is coupled to change or update a program in the IC chip 125c and a second connector 125b for coupling with a plug 172a to transfer signals from a speaker module 171. The contact terminal 125d may include an elastic conductor, e.g., a C-clip, and may be connected to an antenna (not shown). The switching device 125e may turn on/off the wearable electronic device 100 through the user's manipulation or may enable a program embedded in the wearable electronic device 100 to perform a predetermined function.

The first portions 111 may include a first board 111a where the first connector 125a is disposed, second boards 111b disposed at two opposite sides of the first board 111a in a first direction to provide the contact pads 125g, a third board 111c connected to the first board 111a in a second direction perpendicular to the first direction and where an IC chip 125c is disposed, a fourth board 111d connected to the third board 111c in the second direction and where the second connector 125b is disposed, and a fifth board 111e connected to the fourth board 111d in the second direction and where at least one of the contact terminal 125d and the switching device 125e is disposed. The first board 111a may provide first connector openings 113a formed through the first board 111a. The first connector 125a may be connected to the first connector openings 113a. The fourth board 111d may provide second connector openings 113b formed through the fourth board 111d. The second connector 125b may be connected to the second connector openings 113b. A sound input module 125f may be disposed on the fifth board 111e. The fifth board 111e may provide sound input openings 113c formed through the fifth board 111e. The sound input module 125f may be disposed corresponding to the sound input openings 113c, respectively. The sound input openings 113c may be formed adjacent to one or both sides of the contact terminal 125d or the switching device 125e. The first portions 111 may be formed of a stiff material so that the electronic parts may be stably arranged thereon. The second portions 112 may be formed of a flexible material so that the first portions 111 may be rotatably coupled thereto, and the circuit board 101 may surround at least a portion of the bracket 103.

The bracket 103 may have contact surfaces corresponding to the first portions 111 of the circuit board 101, respectively, to support the circuit board 101 so that the wearable electronic device 100 maintains its stereoscopic structure. The contact surfaces may include a first contact surface 131 corresponding to the first board 111a, second contact surfaces 132 corresponding to the second board 111b, a third contact surface 133 corresponding to the third board 111c, a fourth contact surface 134 corresponding to the fourth board 111d, and a fifth contact surface 135 corresponding to the fifth board 111e. A process of arranging the first portions 111 to face one of the first contact surface 131, the second contact surfaces 132, the third contact surface 133, the fourth contact surface 134, and the fifth contact surface 135 is described below with reference to the drawings.

FIGS. 6 to 11 are views illustrating a process of surrounding a bracket with a circuit board.

A double-sided tape or adhesive may be applied onto at least any one of the contact surfaces.

Figure 6:
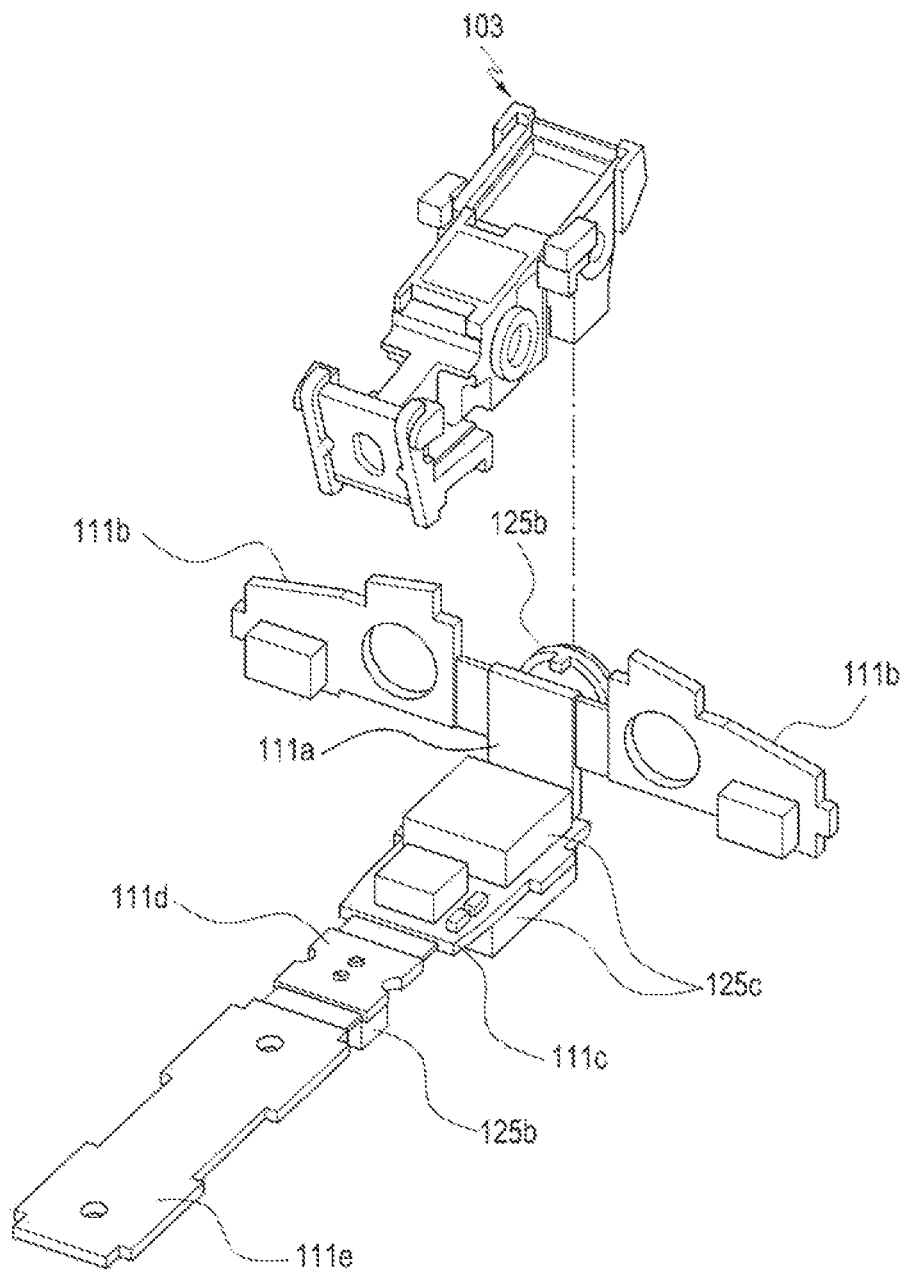
FIGS. 6, 7, 8, 9, 10 and 11 are views illustrating a process of surrounding a bracket with a circuit board.

Referring to FIG. 6, the second portion 112 (FIG. 2) between the first board 111a and the third board 111c may be bent so that the first board 111a and the second board 111b are directed in a direction perpendicular to the third board 111c. The bracket 103 may be moved so that the third contact surface 133 (FIG. 5) of the bracket 103 faces the third board 111c.

Figure 7:
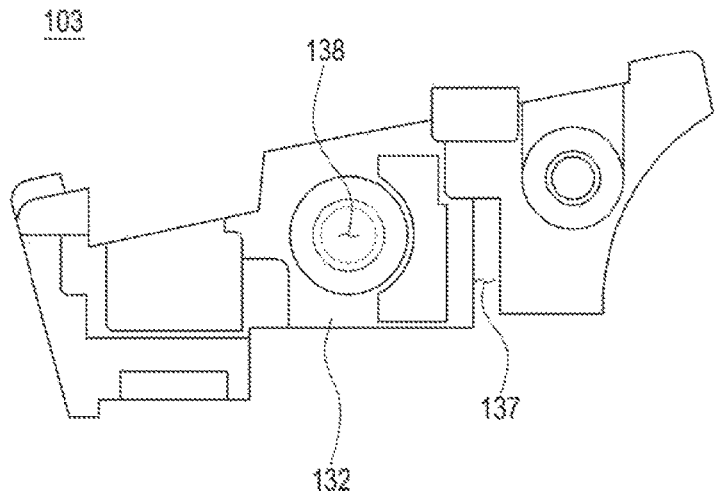
Figure 8:
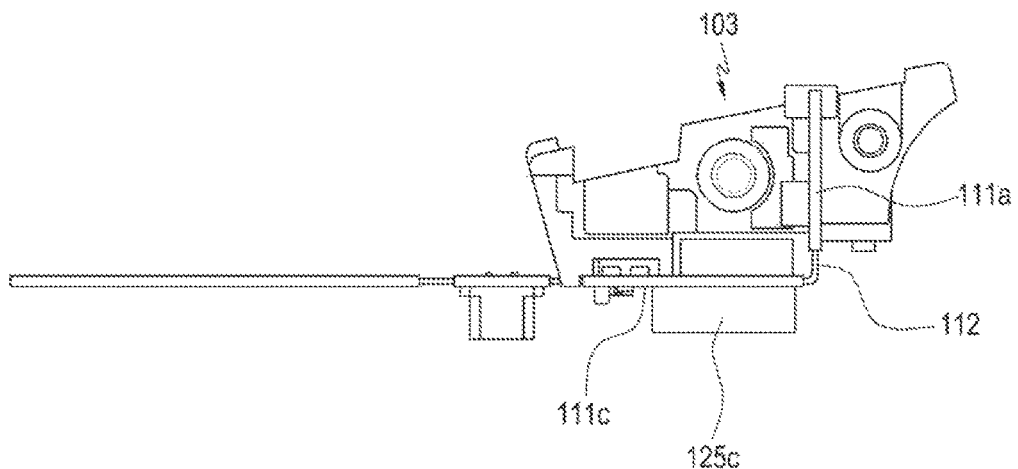
Figure 9:
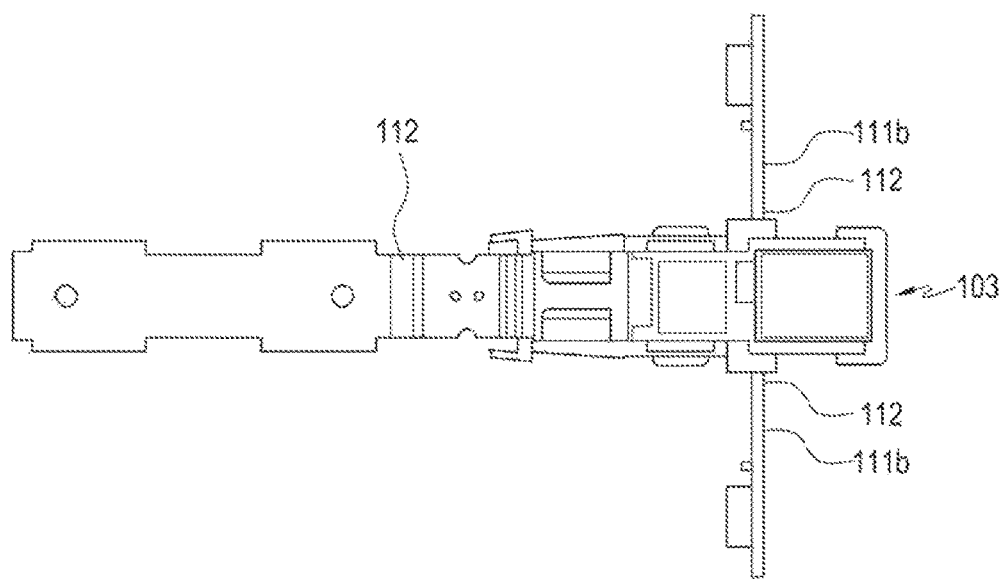

Referring to FIGS. 5 and 7, the bracket 103 may have slits 137 partially traversing two opposite side walls (e.g., the second contact surfaces) of the bracket 103. Referring to FIGS. 8 and 9, two opposite ends of the first board 111a may be inserted and fastened to the slits 137, respectively. Accordingly, the first board 111a and the third board 111c may face the first contact surfaces 131 and the third contact surface 133, respectively. As the first board 111a is fastened to the slits 137, although the plug 172a (FIG. 1) couples or decouples a number of times from the first connector 125a disposed between two opposite side walls of the bracket 103, the first board 111a may remain stably connected to the bracket 103.

Figure 10:
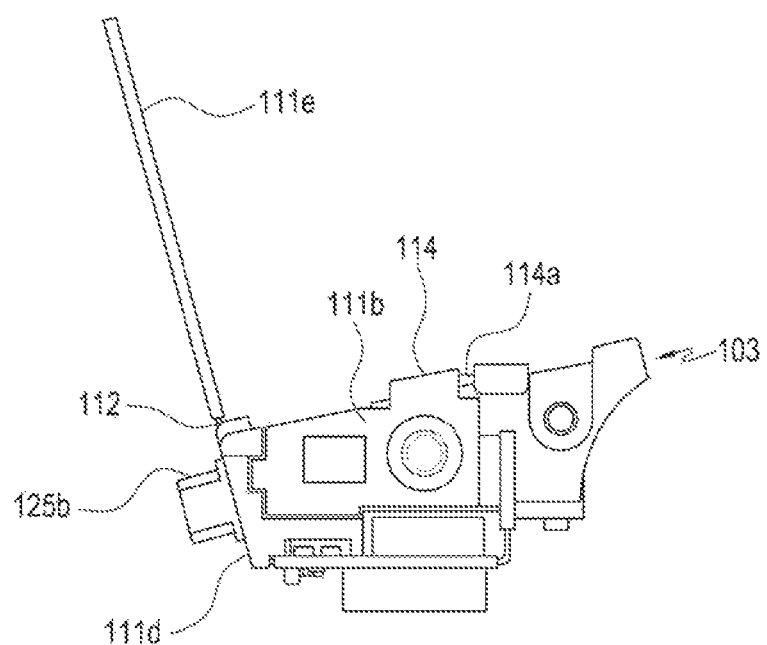
Figure 11:
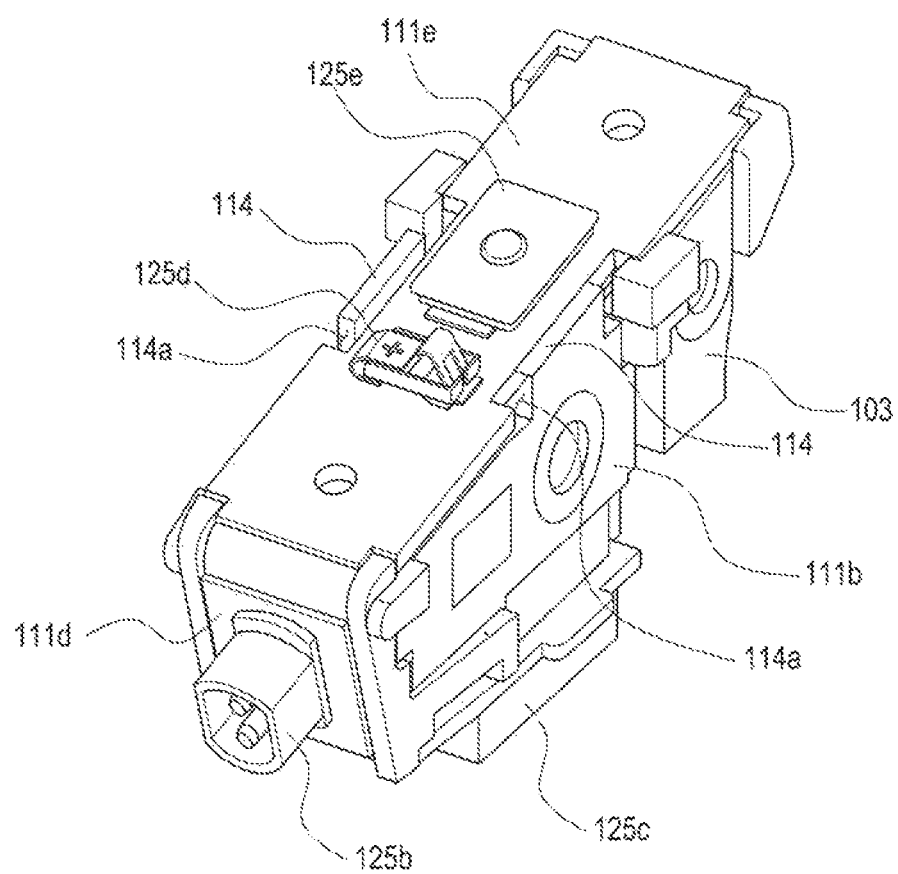

Referring to FIG. 10, when the second portions 112 (FIG. 2) between the first board 111a and the second boards 111b are bent, the second boards 111b may be rendered to face the second contact surfaces 132 (FIG. 4). When the second portion 112 (FIG. 2) between the third board 111c and the fourth board 111d is bent, the fourth board 111d may be rendered to abut the fourth contact surface 134 (FIG. 3). Lastly, when the second portion 112 (FIG. 2) between the fourth board 111d and the fifth board 111e is bent, the fifth board 111e may be rendered to face the fifth contact surface 135 (FIG. 4) as shown in FIG. 11.

Here, as shown in FIGS. 2 and 3, any one, e.g., the second board 111b, of the first portions 111 may have a first protrusion 114, and another, e.g., the fifth board 111e, of the first portions 111 may have a first opening 114a where the first protrusion 114 is inserted. Accordingly, as the first protrusion 114 is fastened to the first opening 114a, the second board 111b may be fastened to the fifth board 111e.

As such, according to an embodiment of the present disclosure, the electronic parts may be arranged along the surfaces of the bracket 103, and thus, there is no need of separate wires or terminals to connect the electronic parts with the circuit board. Thus, the wearable electronic device 100 may be made more compact.

Figure 12:
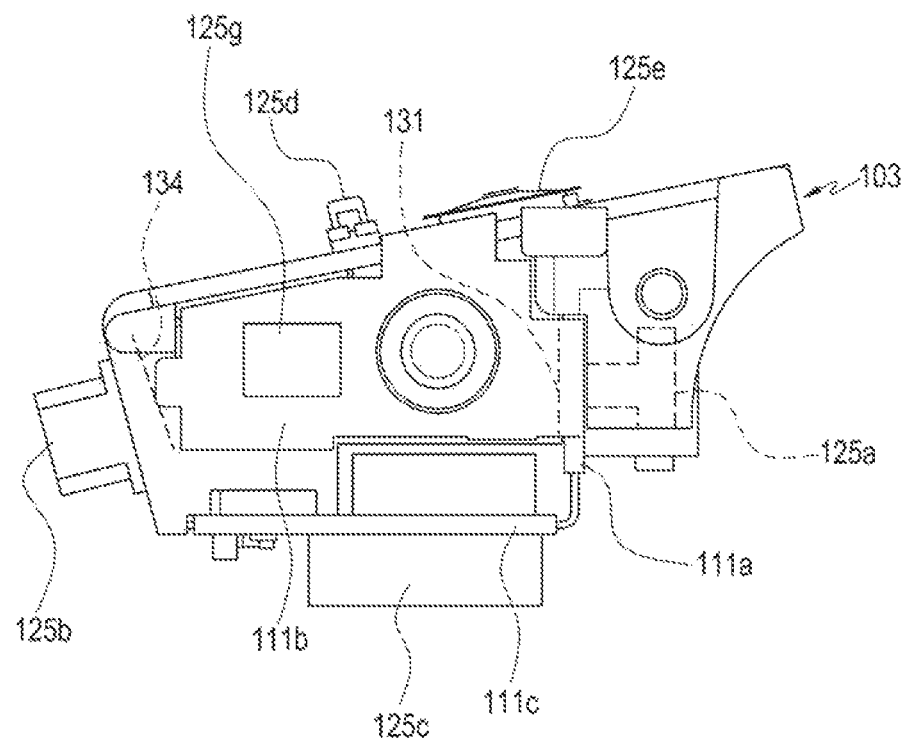
FIG. 12 is a view illustrating an arrangement of electronic parts with a circuit board surrounding a bracket.

FIG. 12 is a view illustrating an arrangement of electronic parts with a circuit board surrounding a bracket.

Referring to FIG. 12, the first contact surface 131 of the bracket 103 corresponding to the first board 111a where the first connector 125a is mounted may face the fourth contact surface 134 of the bracket 103 corresponding to the fourth board 111d (FIG. 2) where the second connector 125b is mounted. In other words, the first board 111a (FIG. 2) where the first connector 125a is mounted, the third board 111c where the IC chip 125c is mounted, the fourth board 111d where the second connector 125b is mounted, and the fifth board 111e where the contact terminal 125d and the switching device 125e are mounted are sequentially arranged in a direction so that the circuit board 101 (FIG. 1) surrounds the bracket 103. Thus, the first connector 125a and the second connector 125b may be arranged to face each other with respect to the bracket 103, and the IC chip 125c may be disposed to face each of the contact terminal 125d and the switching device 125e with respect to the bracket 103. Thus, a data cable (not shown) connected with the first connector 125a may be positioned to face the plug 172a connected with the second connector 125b. However, the present disclosure is not limited to the embodiment in which as the first connector 125a is mounted on the first board 111a, the second connector 125b is mounted on the fourth board 111d (FIG. 2). For example, the first connector 125a and the second connector 125b may be disposed on the first portions 111 to face each other with respect to the bracket 103.

Figure 13:
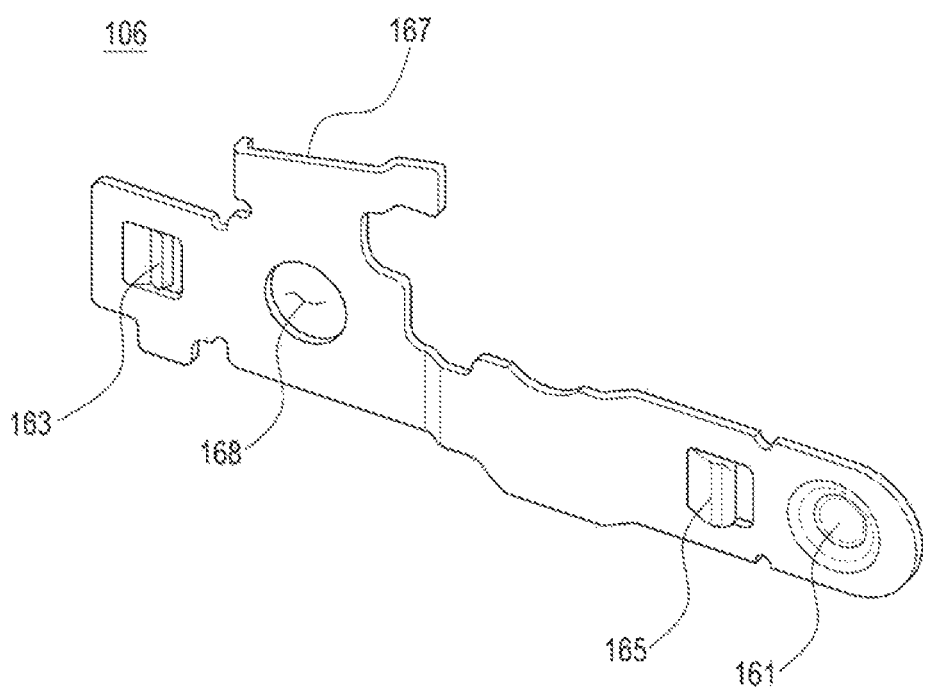
FIG. 13 is a perspective view illustrating a battery connector as illustrated in FIG. 1.
Figure 14:
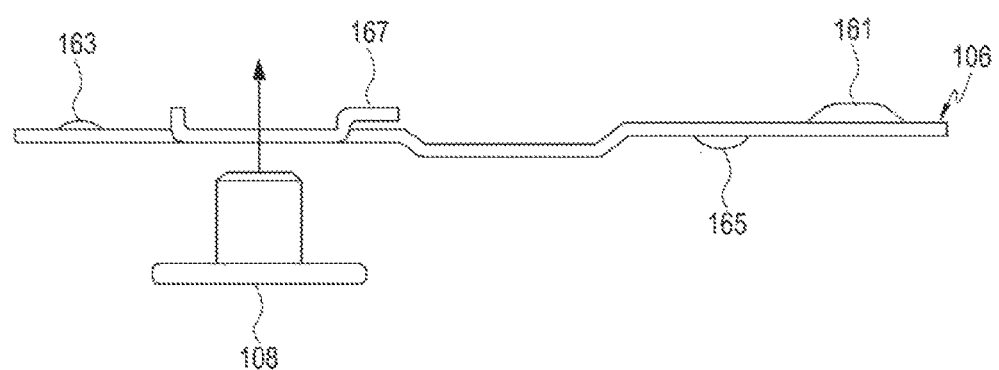
FIG. 14 is a cross-sectional view illustrating a battery connector as illustrated in FIG. 1.
Figure 15:
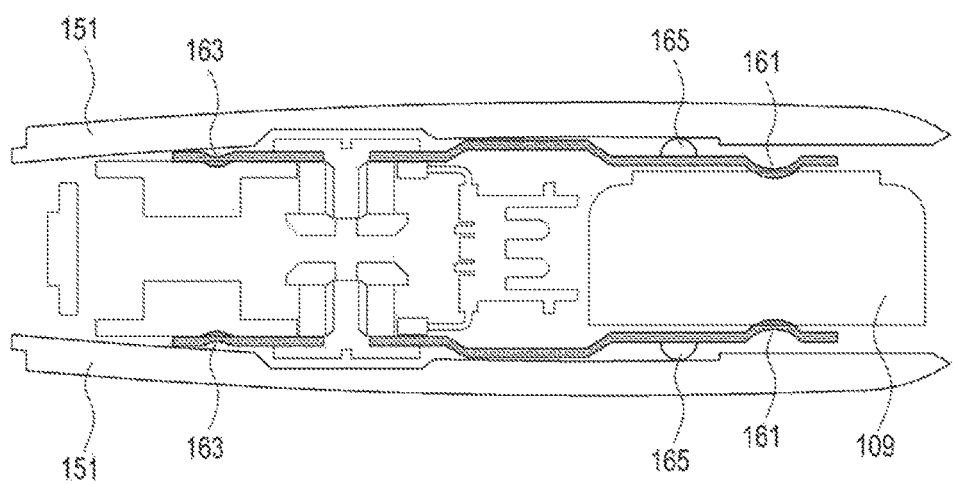
FIG. 15 is a cross-sectional view illustrating a wearable electronic device according to an embodiment of the present disclosure.

FIG. 13 is a perspective view illustrating a battery connector as illustrated in FIG. 1. FIG. 14 is a cross-sectional view illustrating a battery connector as illustrated in FIG. 1. FIG. 15 is a cross-sectional view illustrating a wearable electronic device according to an embodiment of the present disclosure.

Referring to FIGS. 13 to 15, according to an embodiment of the present disclosure, the wearable electronic device 100 (FIG. 1) may further include a battery 109 to supply power and a battery connector 106 to electrically connect the battery 109 with the circuit board 101.

The battery connector 106 may include a first battery terminal portion 161 providing a path to transfer power from the battery 109 to the circuit board 101 and contacting the battery 109, a second battery terminal portion 163 contacting the contact pad 125g (FIG. 12) of the circuit board, a bending portion 165 providing an elastic force to the first battery terminal portion 161, a second opening 168 corresponding to a coupler 108 described below, and a guide portion 167 surrounding the first protrusion 114 (FIG. 12) and inserted to the first opening 114a.

The battery 109 may be removed from the first battery terminal portion 161. In this case, the first battery terminal portion 161 may experience plastic deformation as it consecutively couples or decouples from the battery 109, and thus, the first battery terminal portion 161 might not contact the battery 109. To address such issue, the bending portion 165, which has a shape bent in an opposite direction from the first battery terminal portion 161, may contact an inside wall of the first case 151 to make the first battery terminal portion 161 bend towards the battery 109. Thus, the bending portion 165 may provide an elastic force to the first battery terminal portion 161 in a direction where the first battery terminal portion 161 faces the battery 109.

Figure 16:
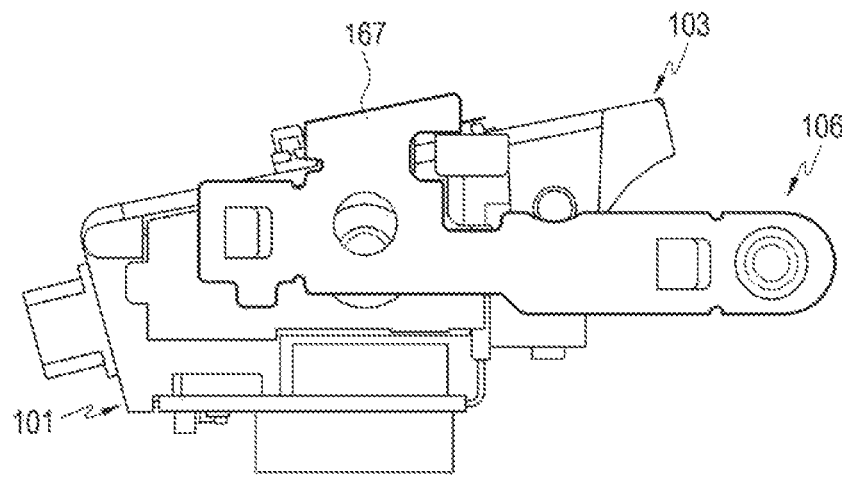
FIGS. 16 and 17 are views illustrating a process of coupling a battery connector as illustrated in FIG. 1 to a bracket.
Figure 17:
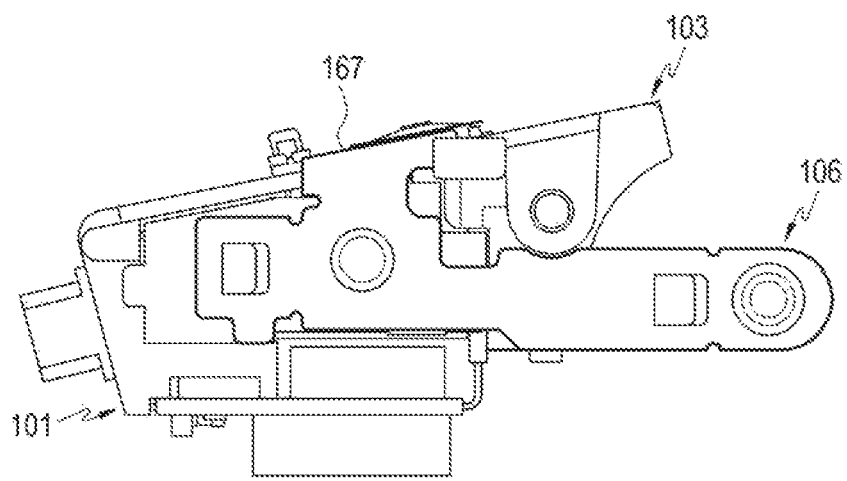
Figure 18:
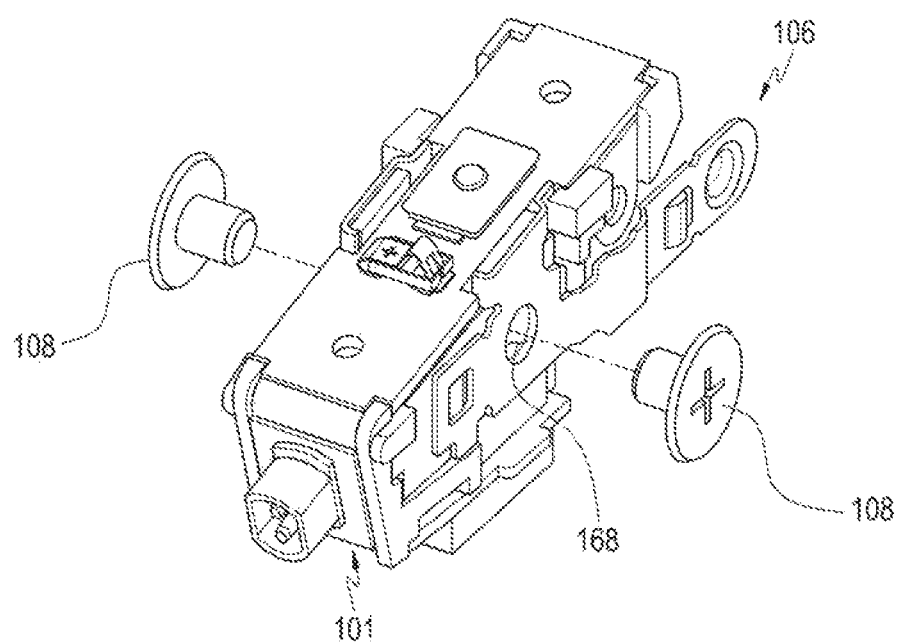
FIG. 18 is a view illustrating a coupler as illustrated in FIG. 1.

FIGS. 16 and 17 are views illustrating a process of coupling a battery connector as illustrated in FIG. 1 to a bracket. FIG. 18 is a view illustrating a coupler as illustrated in FIG. 1.

Referring to FIGS. 16 to 18, the battery connector 106 may be bright in tight contact to two opposite side walls (e.g., the second contact surfaces 132 of FIG. 4) of the bracket 103. As the guide portion 167 is fastened to a portion of the bracket 103 and the first opening 114a while surrounding the first protrusion 114, it may more stably fasten the circuit board 101 and the bracket 103.

According to an embodiment of the present disclosure, the wearable electronic device may further include a first opening 181 (FIG. 4) formed in the bracket 103, a second opening 168 formed in the battery connector 106 and corresponding to the first opening 181 (FIG. 4), a third opening 118 (FIG. 2) formed in the circuit board 101 (FIG. 2) and corresponding to the first opening 181 and the second opening 168, and a coupler 108 coupling through the first opening 181, the second opening 168, and the third opening 118, respectively. As the coupler 108, a normal bolt, may be screwed to the first opening 181 (FIG. 4), the battery connector 106, together with the coupler 108, may fasten the circuit board 101 and the bracket 103 more securely.

Figure 19:
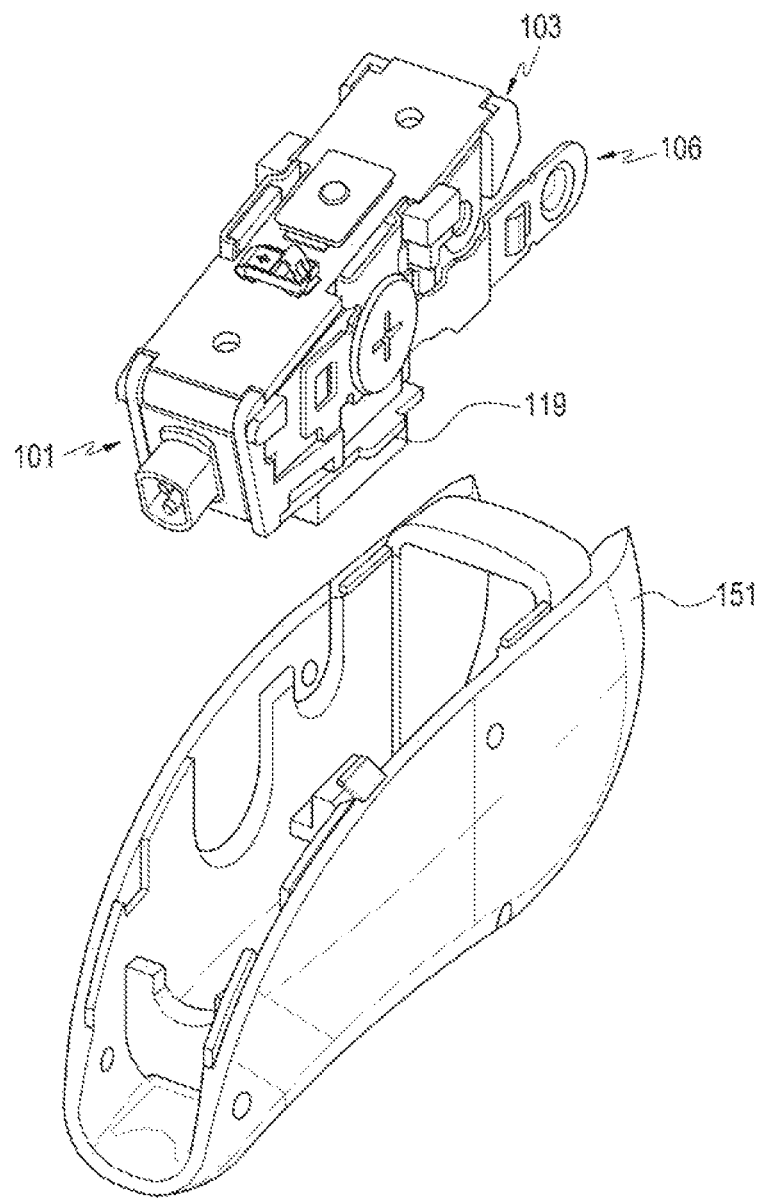
FIGS. 19 and 20 are perspective views illustrating a process of receiving a circuit board as illustrated in FIG. 1 in a case with the circuit board surrounded by a bracket.
Figure 20:
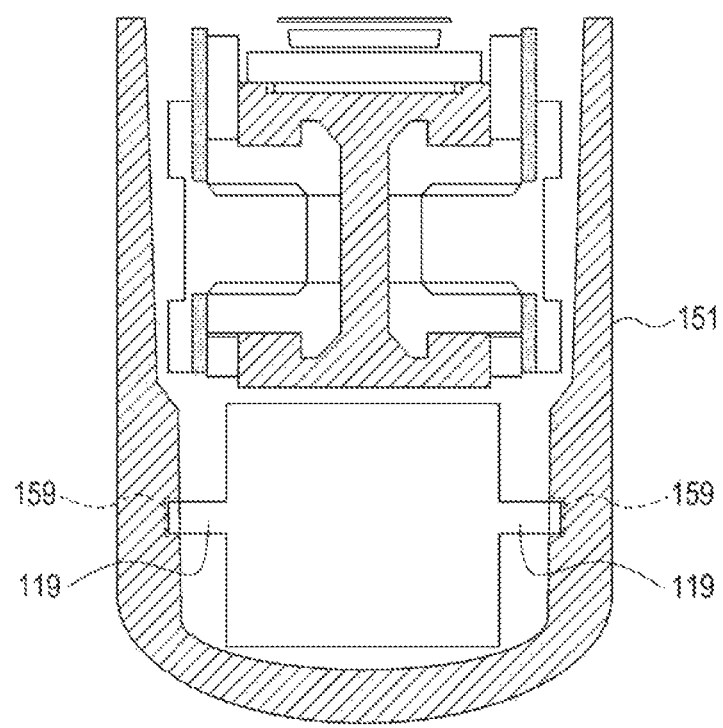

FIGS. 19 and 20 are perspective views illustrating a process of receiving a circuit board as illustrated in FIG. 1 in a case with the circuit board surrounded by a bracket.

Referring to FIG. 19, the circuit board 101 may be received in the case 150 through an opened side wall of the case 150 while surrounded by the bracket 103.

The third board 111c may have a second protrusion 119. A second opening 159 may be formed in an inside of the first case 151 to have the second protrusion 119 inserted therethrough. Accordingly, as the circuit board 101 is received in the case 150, the second protrusion 119 may be inserted to the second opening 159, so that the third board 111c may be fastened to the first case 151. However, the present disclosure is not limited to the embodiment where the second protrusion 119 is formed on the third board 111c. For example, the second protrusion 119 may be formed on the fifth board 111e facing the third board 111c.

Figure 21:
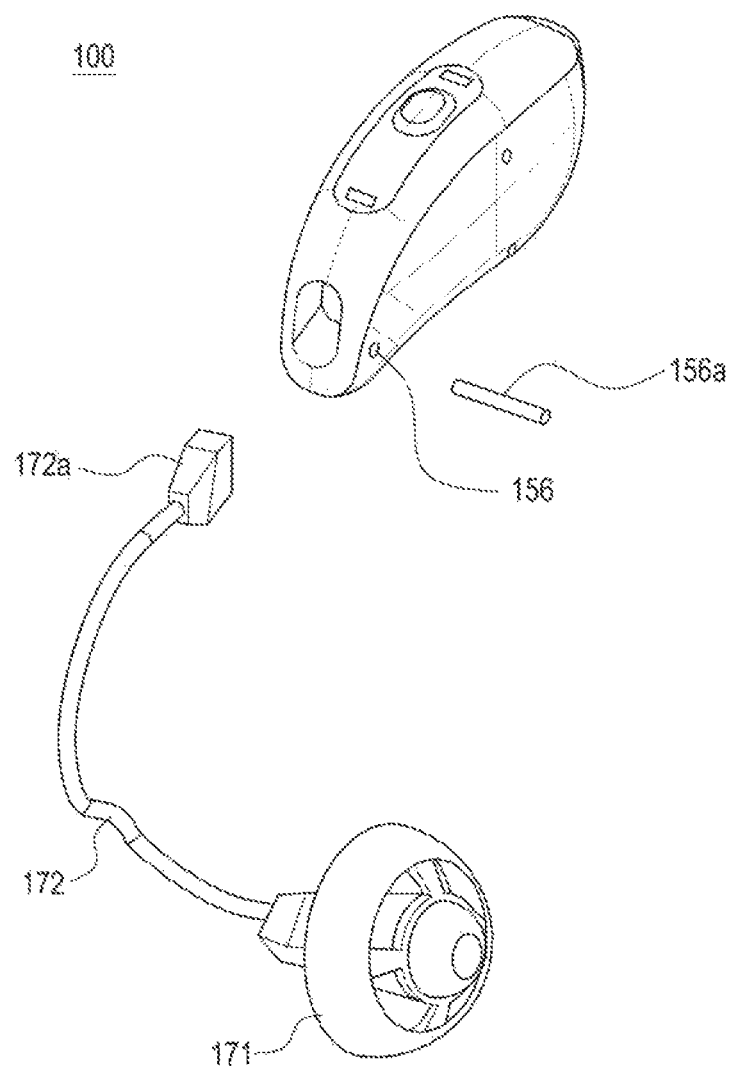
FIG. 21 is a view illustrating an example in which a speaker module as illustrated in FIG. 1 is connected to a case.
Figure 22:
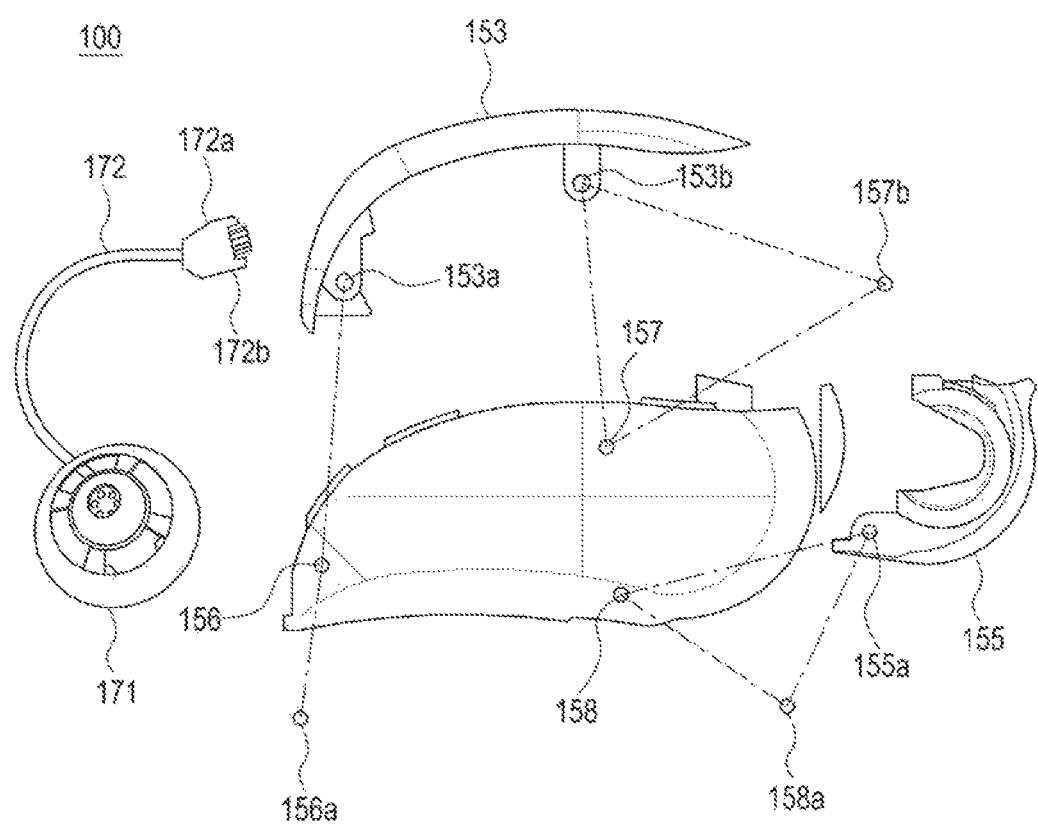
FIG. 22 is a view illustrating an example in which first, second, and third cases as illustrated in FIG. 1 are coupled.
Figure 23:
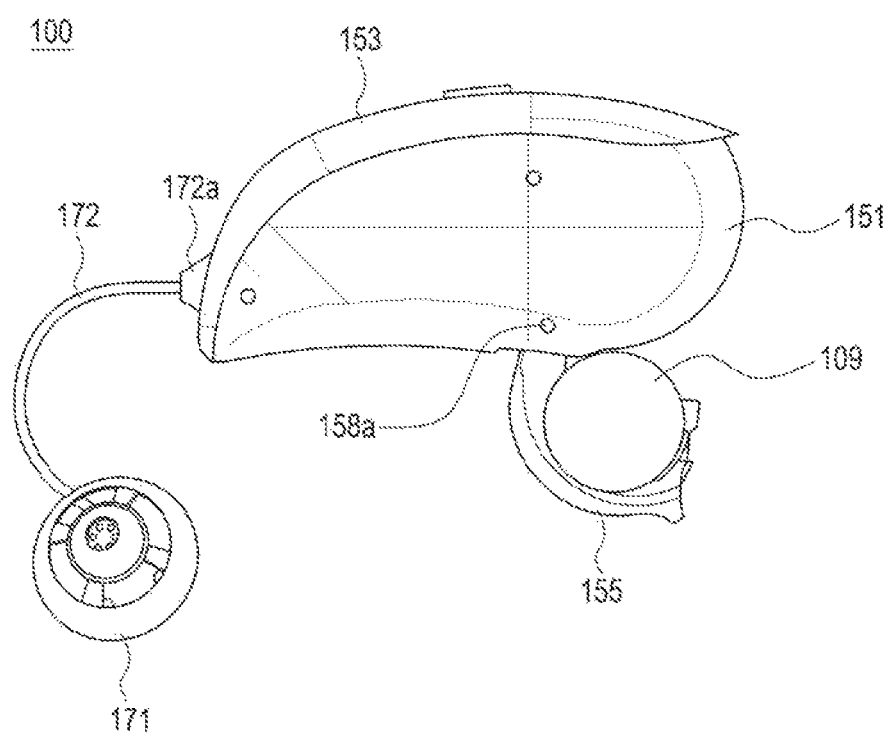
FIG. 23 is a view illustrating an example in which a third case as illustrated in FIG. 1 has been rotated.

FIG. 21 is a view illustrating an example in which a speaker module as illustrated in FIG. 1 is connected to a case. FIG. 22 is a view illustrating an example in which first, second, and third cases as illustrated in FIG. 1 are coupled. FIG. 23 is a view illustrating an example in which a third case as illustrated in FIG. 1 has been rotated.

Referring to FIGS. 21 and 23, according to an embodiment of the present disclosure, the wearable electronic device 100 may further include a case 150, a speaker module 171, a wire 172, a plug 172a, a first coupling pin 156a, a second coupling pin 156b, and a third coupling pin 156c.

The case 150 may accommodate the circuit board 101 (FIG. 1), the bracket 103 (FIG. 1), and the battery 109. The case 150 may have a first case 151, a second case 152 coupled to the first case 151, and a third case 155 rotatably coupled to the first case 151. The first case 151 has at least one opened side wall. The first case 151 may receive the circuit board 101 (FIG. 1), the bracket 103 (FIG. 1), and the battery 109 through the opened side wall. The second case 153 may close a portion of the opened portion of the first case 151 to receive or hide the circuit board 101 (FIG. 1) and the bracket 103. The third case 155 may be rotatably coupled to the first case 151 to open or close the rest of the opened portion of the first case. The battery 109 may be mounted in the third case 155. As the third case 155 rotates, the battery 109 may be selectively received in the first case 151 and the second case 153.

The speaker module 171 may be put in the user's hear to output sounds. The wire 172 may extend from the speaker module 171 and seat itself on the user's ear to allow the wearable electronic device 100 to be worn on the user's body to be carried. The plug 172a may be provided at an end of the wire 172 and couple with the first connector 125a (FIG. 1). As such, according to an embodiment of the present disclosure, the wearable electronic device 100 may amplify a sound received through the sound input module 125f by the IC chip 125c and may output the amplified sound through the speaker module 171.

The first case 151 may have a first coupling opening 156, a second coupling opening 157, and a third coupling opening 158 passing inside-to-outside through the first case 151, the second case 153 may have the fifth coupling opening 153a and the sixth coupling opening 153b, respectively, corresponding to the first coupling opening 156 and the second coupling opening 157, and the third case 155 may have a seventh coupling opening 155a corresponding to the third coupling opening 158.

According to an embodiment of the present disclosure, the wearable electronic device 100 may further include a first coupling pin 156a, a second coupling pin 157b, and a third coupling pin 158a coupling the second case 153 and the third case 155 to the first case 151.

The first coupling pin 156a, the second coupling pin 157b, and the third coupling pin 158a may have a first coupling pin 156a inserted to the first coupling opening 156, a second coupling pin 156b inserted to the second coupling opening 157, and a third coupling pin 158a inserted to the third coupling opening 158, respectively. As the first coupling pin 156a is inserted to the first coupling opening 156, and the second coupling pin 157b is inserted to the second coupling opening 157 and the sixth coupling opening 153b, the second case 153 may be coupled to the first case 151.

The plug 172a may have a plug coupling opening 172b formed on its outer surface. One, e.g., the first coupling pin 156a, of the coupling pins may be engaged with the plug coupling opening 172b while the plug 172a connects with the first connector 125a. Accordingly, the plug 172a may be fastened to the case 150 by the first coupling pin 156a.

The third coupling pin 158a may be inserted to the seventh coupling opening 155a and the third coupling opening 158. The third coupling pin 158a may be a shaft to allow the third case 155 to rotate about the first case 151. As shown in FIG. 23, as the third case 155 rotates about the third coupling pin 158a while receiving the battery 109, the user may exchange batteries 109.

Figure 24:
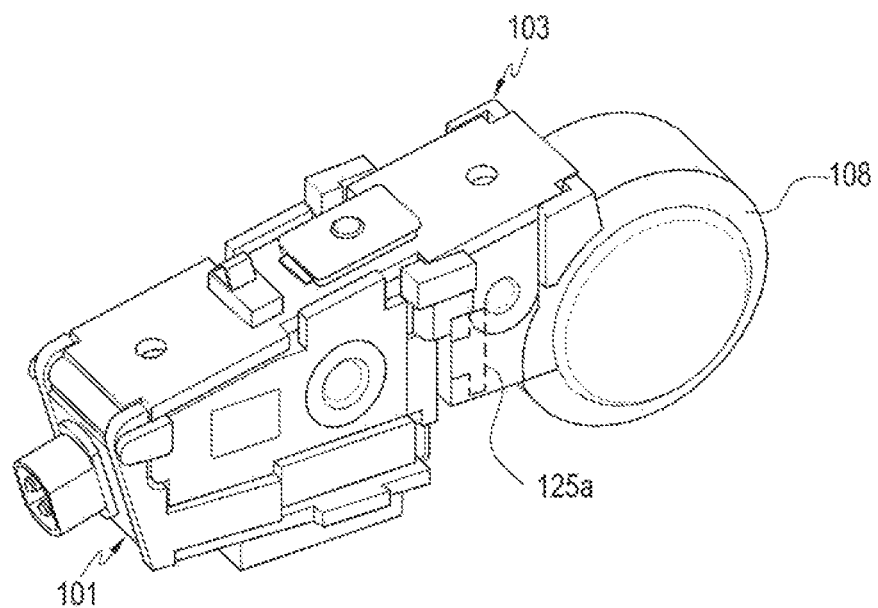
FIG. 24 is a view illustrating an arrangement of a battery and electronic parts as illustrated in FIG. 1.
Figure 25:
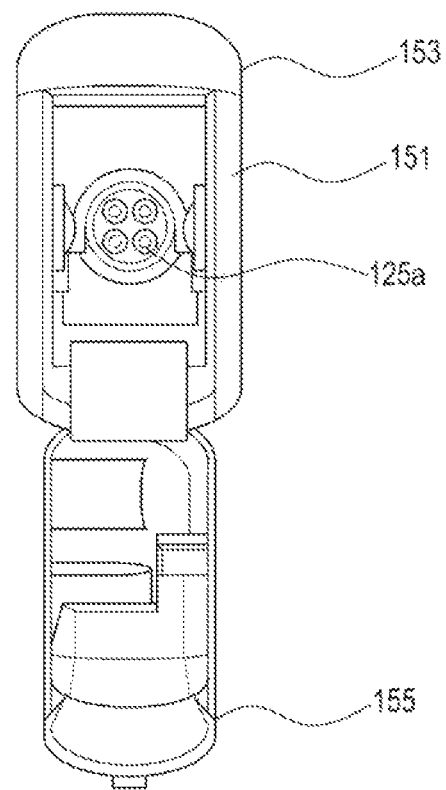
FIG. 25 is a view illustrating an example in which a third case as illustrated in FIG. 1 is rotated so that a first connector is externally exposed.

FIG. 24 is a view illustrating an arrangement of a battery and electronic parts as illustrated in FIG. 1. FIG. 25 is a view illustrating an example in which a third case as illustrated in FIG. 1 is rotated so that a first connector is externally exposed.

Referring to FIGS. 24 and 25, the first board 111a where the first connector 125a is mounted may be positioned adjacent to the battery 109. As the third case 155 rotates, the first connector 125a mounted on the first board 111a may be externally exposed. As such, according to an embodiment of the present disclosure, in the wearable electronic device 100, as the third case 155 rotates, the battery 109 may be replaced, and the first connector 125a may be selectively exposed to the outside for coupling with an external data cable.

Figure 26:
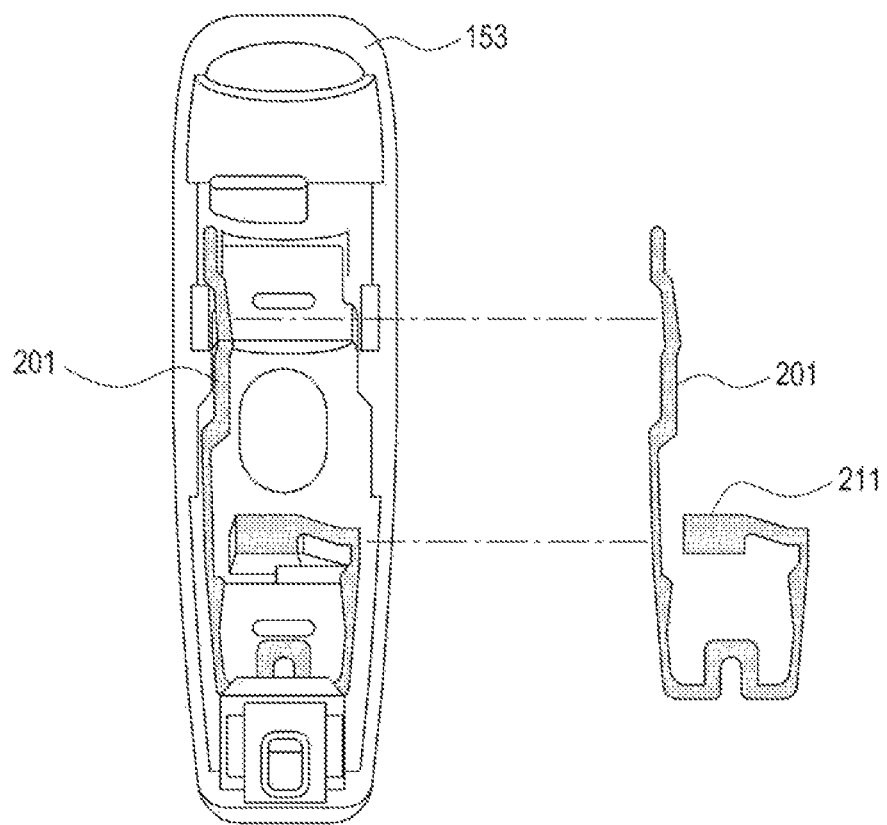
FIG. 26 is a view illustrating an example in an antenna is received in a second case as illustrated in FIG. 1.

FIG. 26 is a view illustrating an example in an antenna is received in a second case as illustrated in FIG. 1.

Referring to FIG. 26, according to an embodiment of the present disclosure, the wearable electronic device 100 may further include a radiating conductor 201 disposed in an inner circumferential surface of the second case 153. The radiating conductor 201 may have a pattern corresponding to a portion of the inner circumferential surface of the second case 153. A portion 211 of the radiating conductor 201 may contact the contact terminal 125d (FIG. 2) and resultantly the circuit board 101 (FIG. 2). The radiating conductor 201 may have various lengths or shapes depending on Bluetooth, wireless fidelity (Wi-Fi), 3rd generation (3G), long term evolution (LTE), or other communication schemes.

As shown in FIG. 22, the second case 153 may be separated from the first case 151 by removing the first coupling pin 156a and the second coupling pin 157b from the first case 151 and the second case 153. Accordingly, the user may replace the second case 153 and may use his desired communication scheme.

Figure 27:
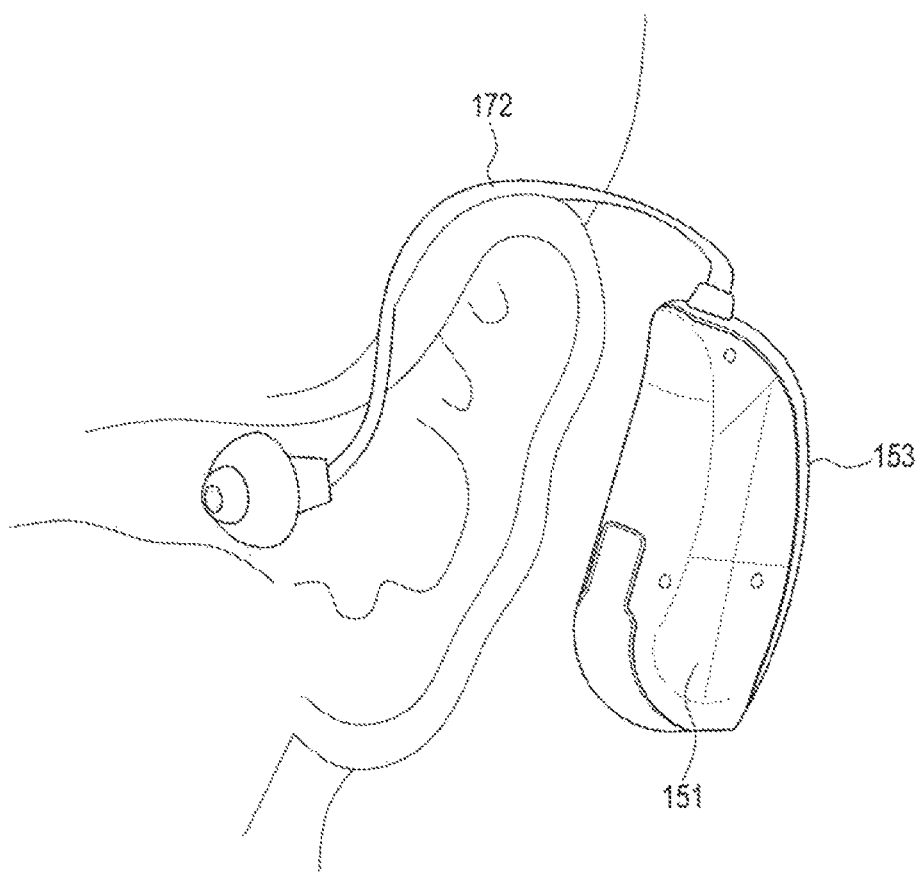
FIG. 27 is a view illustrating an example of use of a wearable electronic device according to an embodiment of the present disclosure.

FIG. 27 is a view illustrating an example of use of a wearable electronic device according to an embodiment of the present disclosure.

Referring to FIG. 27, according to an embodiment of the present disclosure, the wearable electronic device 100 may be carried on as the wire 172 is worn on the user's ear. The outer circumferential surface of the first case 151 may have a shape corresponding to a portion of the user's body (e.g., an ear), and the first case 151 may abut the portion (e.g., an ear) of the user's body. As the second case 153 is further away from the user's body than the first case 151 is, the radiating conductor 201 (FIG. 26) provided in the second case 153 may exhibit increased radiating efficiency.

Referring back to FIGS. 1 to 3, as the fifth board 111e is disposed adjacent to the second case 153, the switching device 125e and the sound input module 125f mounted on the fifth board 111e may also be positioned away from the user's body, and thus, interference with the switching device 125e and the sound input module 125f by the user's body may be minimized.

Figure 28:
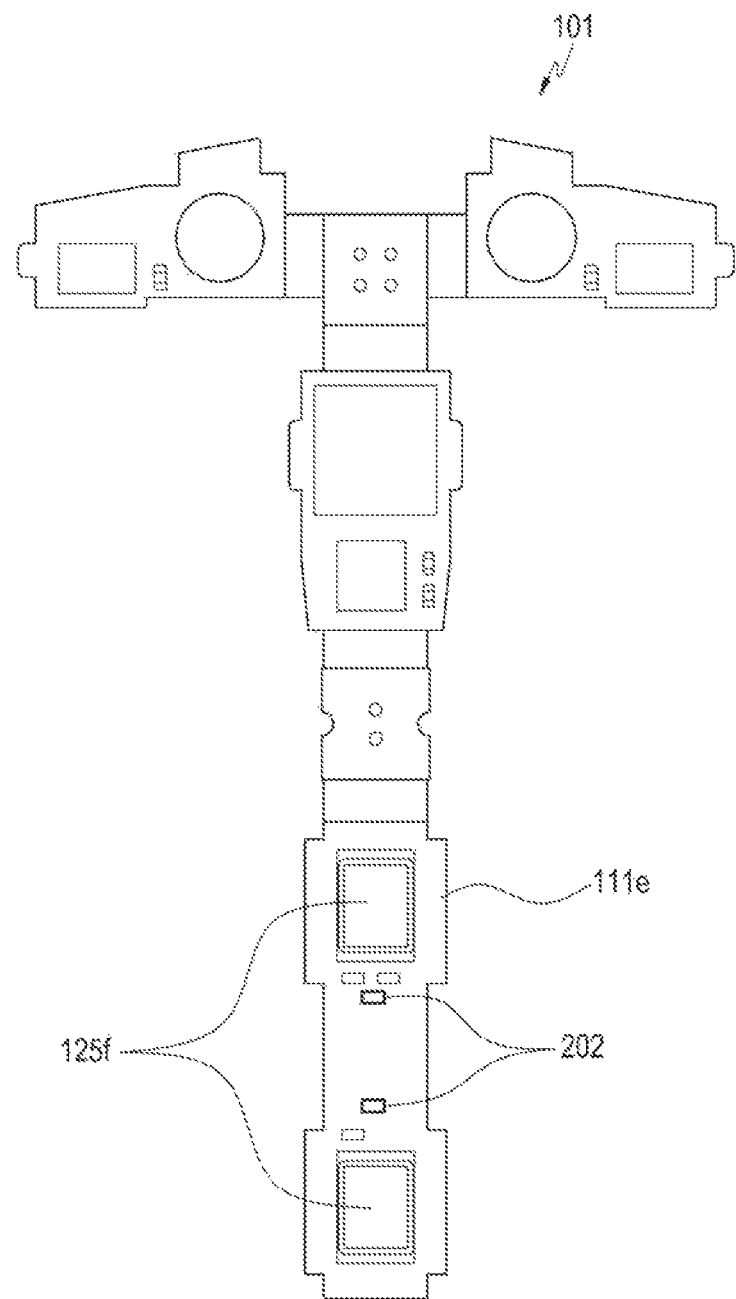
FIG. 28 is a rear view illustrating a circuit board of a wearable electronic device according to an embodiment of the present disclosure.

FIG. 28 is a rear view illustrating a circuit board of a wearable electronic device according to an embodiment of the present disclosure. In this embodiment, the same reference denotations may be used or omitted for the same or similar components to those described in the above embodiments.

Referring to FIG. 28, according to an embodiment of the present disclosure, the circuit board 101 of the wearable electronic device may include chip antennas 202.

The chip antennas 202 may be arranged between a pair of sound input modules 125f on the fifth board 111e to perform Bluetooth-based wireless communication, for example. As the chip antennas 202 are arranged on the fifth board 111e adjacent to the second case 153 (FIG. 27) that is away from the user's body, the radiating efficiency of the chip antennas 202 may be secured. As such, according to an embodiment of the present disclosure, the wearable electronic device may perform wireless communication even without the radiating conductor on the second case 153.

Figure 29:
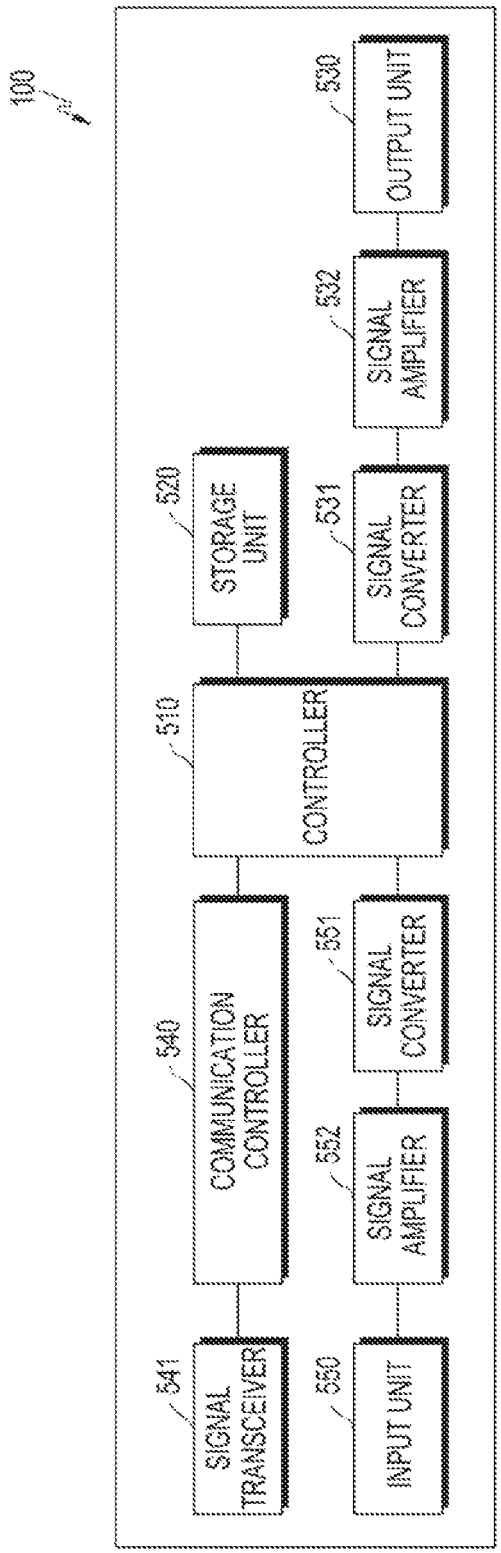
FIG. 29 is a block diagram illustrating a wearable electronic device according to an embodiment of the present disclosure.

FIG. 29 is a block diagram illustrating a wearable electronic device according to an embodiment of the present disclosure.

Referring to FIG. 29, according to an embodiment of the present disclosure, the wearable electronic device 100 may include a controller 510, an input unit 550, an output unit 530, a communication controller 540, and a storage unit 520.

The input unit 550 may convert sound information from the outside into an input signal. The input unit 550 may be the sound input module 125f as described in FIG. 3.

The controller 510 may process the input signal (e.g., applying an audio filer to the input signal or amplify the input signal) and may transfer the processed signal to the output unit 530.

The output unit 530 may output the signal processed by the controller 510. The output unit 530 may be the speaker module 171 (FIG. 22).

According to an embodiment of the present disclosure, the wearable electronic device 100 may further include signal converters 551 and 531 and signal amplifiers 552 and 532. The signal converter 551 may convert the input signal or processed signal into a digital signal when the input signal or processed signal is an analog signal or into an analog signal when the input signal or processed signal is a digital signal.

The wearable electronic device 100 may be wiredly or wirelessly connected to another electronic device (e.g., a mobile phone, portable electronic device, or tablet) or a network. In the case of wireless communication, the communication controller 540 may perform signal processing (e.g., applying an audio filter or amplifying) on an input signal received through an antenna and transfer the signal-processed signal to the controller 510. The controller 510 may process the received input signal and transfer the processed signal to the output unit 530.

The controller 510 may configure different types of signal processing (e.g., applying an audio filter or amplifying) depending on input signals received through the communication controller 540 or input unit 550. In a normal mode, a first input signal may be transferred through the input unit 550 to the controller 510. The controller 510 may transfer the first input signal from the input unit 550 to the output unit 530. When there is a second input signal to the communication controller 540, the controller 510 may transfer the second input signal to a signal transceiver 541.

The controller 510 may set whether there is a first input signal from the input unit 550 to differ for each time period. For example, when the magnitude of the first input signal during the daytime is larger than a predetermined first magnitude, the controller 510 may transfer the first input signal to the output unit 530. When the magnitude of the first input signal at nighttime is larger than a predetermined second magnitude, the controller 510 may transfer the first input signal to the output unit 530. Here, the second magnitude may be smaller than the first magnitude. Such settings may be made opposite as required by the user.

When there is the first input signal, the controller 510 may analyze the first input signal to determine whether the first input signal is similar to a signal stored in the storage unit 520. When the first input signal is determined to be a noise signal, the controller 510 may remove the first input signal. Unless a predetermined value or more of first input signal occurs during a particular time, the controller 510 may turn at least a portion of the wearable electronic device into a low-power mode.

As described above, according to an embodiment of the present disclosure, a wearable electronic device comprises a circuit board including first portions where electronic parts are mounted and second portions arranged between the first portions and rotatably connecting the first portions with each other, and a bracket having contact surfaces corresponding to the first portions. The circuit board may be coupled to surround at least a portion of the bracket.

According to an embodiment of the present disclosure, any one of the first portions may include a first protrusion, and another of the first portions may include a first opening to which the first protrusion is inserted.

According to an embodiment of the present disclosure, the electronic parts may include at least one of an integrated circuit (IC) chip or connectors.

According to an embodiment of the present disclosure, the electronic parts may include at least a pair of connectors.

According to an embodiment of the present disclosure, a contact surface of the bracket corresponding to a first portion where a first connector of the connectors is mounted may face a contact surface of the bracket corresponding to a first portion where a second connector of the connectors is mounted.

According to an embodiment of the present disclosure, the bracket may include slits formed to partially traverse two opposite side walls of the bracket, and two opposite ends of the first portion where the first connector is mounted may be inserted and fastened to the slits, respectively.

According to an embodiment of the present disclosure, the first connector may be disposed between two opposite side walls of the bracket.

According to an embodiment of the present disclosure, the wearable electronic device may further comprise a portion of a case rotating about the bracket. As the portion of the case rotates, the first connector may be selectively exposed.

According to an embodiment of the present disclosure, the wearable electronic device may further comprise a battery supplying power and a case accommodating the circuit board, the bracket, and the battery.

According to an embodiment of the present disclosure, the wearable electronic device may further comprise a battery connector connecting the battery with the circuit board.

According to an embodiment of the present disclosure, any one of the first portions may include a first protrusion, and another of the first portions may include a first opening to which the first protrusion is inserted. The battery connector may include a guide portion inserted to the first opening while surrounding a portion of the first protrusion.

According to an embodiment of the present disclosure, the wearable electronic device may further comprise a first opening formed in the bracket, a second opening formed in the battery connector and corresponding to the first opening, and a coupler coupled through the first and second openings.

According to an embodiment of the present disclosure, the battery connector may include a first battery terminal portion contacting the battery and a bending portion providing an elastic force to the first battery terminal portion.

According to an embodiment of the present disclosure, the case of the wearable electronic device may include a first case having at least an opened side wall and abutting a portion of a user's body, a second case coupled to the first case to partially close the opened portion of the first case to receive and hide the circuit board and the bracket, and a third case rotatably coupled to the first case to open or close the remaining opened portion of the first case. The battery may be mounted in the third case, and as the third case rotates, the battery may be selectively received in the first and second cases.

According to an embodiment of the present disclosure, the first portion where a connector of the electronic parts is mounted may be disposed adjacent to the battery, and as the third case rotates, the connector mounted in the first portion may be exposed.

According to an embodiment of the present disclosure, the wearable electronic device may further comprise coupling pins coupling the second and third cases to the first case.

According to an embodiment of the present disclosure, the wearable electronic device may further comprise a speaker module, a wire extending from the speaker module, and a plug provided at an end of the wire.

According to an embodiment of the present disclosure, the wearable electronic device may further comprise a connector provided in any one of the first portions. The plug may be connected to the connector.

According to an embodiment of the present disclosure, the wearable electronic device may further comprise a plug coupling opening formed in an outer circumferential surface of the plug. One of the coupling pins may be engaged with the plug coupling opening while the plug remains connected to the connector.

According to an embodiment of the present disclosure, the wearable electronic device may further comprise a radiating conductor disposed in an inner circumferential surface of the second case and a contact terminal provided in any one of the first portions. The radiating conductor may contact the contact terminal and may connect to the circuit board.

According to an embodiment of the present disclosure, the first portions may include a first board where a first connector of the electronic parts is disposed, second boards respectively disposed at two opposite sides of the first board in a first direction, a contact pad of the electronic parts disposed in the second boards, a third board connected to the first board in a second direction perpendicular to the first direction, at least one IC chip of the electronic parts disposed in the third board, a fourth board connected to the third board in the second direction, a second connector of the electronic parts disposed in the fourth board, and a fifth board connected to the fourth board in the second direction, at least one of a switching device and a contact terminal of the electronic parts disposed in the fifth board.

According to an embodiment of the present disclosure, as the second portions each are bent, the first to fifth boards, each, may be disposed to face one of the contact surfaces of the bracket.

According to an embodiment of the present disclosure, the wearable electronic device may further comprise at least one sound input module disposed on the fifth board and at least one sound input opening formed through the fifth board. The at least one sound input opening, respectively, may be disposed to correspond to the at least one sound input module.

According to an embodiment of the present disclosure, the at least one sound input opening, respectively, may be disposed at two opposite sides of the switching device or the contact terminal.

As is apparent from the foregoing description, according to embodiments of the present disclosure, the wearable electronic device has a structure in which the circuit board having electronic parts thereon surrounds the bracket, eliminating the need of separate wires for connecting the electronic parts with the circuit board. Thus, the wearable electronic device may be made more compact. Further, the electronic parts may be arranged corresponding to the contact surface of the bracket. Thus, the efficiency of assembling the wearable electronic device may be increased, and the electronic parts may be utilized in a stereoscopic manner.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A wearable electronic device, comprising:
   a circuit board including first portions where a plurality of electronic parts are mounted, and second portions arranged between the first portions and rotatably connecting the first portions with each other; and
   a bracket having a plurality of contact surfaces corresponding to the first portions, wherein the circuit board is coupled to surround at least a portion of the bracket,
   wherein any one of the first portions includes a first protrusion, and wherein another of the first portions includes a first opening to which the first protrusion is inserted.

2. The wearable electronic device of claim 1, wherein the electronic parts include at least one of an integrated circuit (IC) chip or connectors.

3. The wearable electronic device of claim 1, wherein the electronic parts include a pair of connectors.

4. The wearable electronic device of claim 3, wherein one of the contact surfaces of the bracket corresponding to one of the first portions where a first connector of the pair of connectors is mounted faces one of the contact surfaces of the bracket corresponding to a first portion where a second connector of the pair of connectors is mounted.

5. The wearable electronic device of claim 4, wherein the bracket includes slits formed to partially traverse two opposite side walls of the bracket, and wherein two opposite ends of the first portion where the first connector is mounted are inserted and fastened to the slits, respectively.

6. The wearable electronic device of claim 5, wherein the first connector is disposed between two opposite side walls of the bracket.

7. The wearable electronic device of claim 4, further comprising a portion of a case rotating about the bracket, and wherein as the portion of the case rotates, the first connector is selectively exposed.

8. The wearable electronic device of claim 1, further comprising:
   a battery that supplies power; and
   a case that accommodates the circuit board, the bracket, and the battery.

9. The wearable electronic device of claim 8, further comprising a battery connector connecting the battery with the circuit board.

10. The wearable electronic device of claim 9, wherein any one of the first portions includes a first protrusion, wherein another of the first portions includes a first opening to which the first protrusion is inserted, and wherein the battery connector includes a guide portion inserted to the first opening while surrounding a portion of the first protrusion.

11. The wearable electronic device of claim 9, further comprising:
   a first opening formed in the bracket;
   a second opening formed in the battery connector and corresponding to the first opening; and
   a coupler coupled through the first opening and the second opening.

12. The wearable electronic device of claim 9, wherein the battery connector includes a first battery terminal portion contacting the battery and a bending portion providing an elastic force to the first battery terminal portion.

13. The wearable electronic device of claim 8, wherein the case includes a first case having at least an opened side wall and abutting a portion of a user's body, a second case coupled to the first case to partially close an opened portion of the first case to receive and hide the circuit board and the bracket, and a third case rotatably coupled to the first case to open or close the remaining opened portion of the first case, and wherein the battery is mounted in the third case, and as the third case rotates, the battery is selectively received in the first and second cases.

14. The wearable electronic device of claim 13, wherein the first portion where a connector of the electronic parts is mounted is disposed adjacent to the battery, and wherein as the third case rotates, the connector mounted in the first portion is exposed.

15. The wearable electronic device of claim 13, further comprising a plurality of coupling pins coupling the second case and the third case to the first case.

16. The wearable electronic device of claim 15, further comprising:
   a speaker module;
   a wire extending from the speaker module; and
   a plug provided at an end of the wire.

17. The wearable electronic device of claim 16, further comprising a connector provided in any one of the first portions, wherein the plug is connected to the connector.

18. The wearable electronic device of claim 17, further comprising a plug coupling opening formed in an outer circumferential surface of the plug, wherein one of the plurality of coupling pins is engaged with the plug coupling opening while the plug remains connected to the connector.

19. The wearable electronic device of claim 13, further comprising:
   a radiating conductor disposed in an inner circumferential surface of the second case; and
   a contact terminal provided in any one of the first portions, wherein the radiating conductor contacts the contact terminal and connects to the circuit board.

20. The wearable electronic device of claim 1, wherein the first portions include a first board where a first connector of the electronic parts is disposed, second boards respectively disposed at two opposite sides of the first board in a first direction, a contact pad of the electronic parts disposed in the second boards, a third board connected to the first board in a second direction perpendicular to the first direction, an integrated circuit chip of the electronic parts disposed in the third board, a fourth board connected to the third board in the second direction, a second connector of the electronic parts disposed in the fourth board, and a fifth board connected to the fourth board in the second direction, at least one of a switching device and a contact terminal of the electronic parts disposed in the fifth board.

21. The wearable electronic device of claim 20, wherein as the second portions are bent, the first board, the second boards, the third board, the fourth board, and the fifth board are disposed to face one of the contact surfaces of the bracket.

22. The wearable electronic device of claim 20, further comprising:
   a sound input module disposed on the fifth board; and
   a sound input opening formed through the fifth board, wherein the sound input opening is disposed to correspond to the sound input module.

23. The wearable electronic device of claim 22, wherein the sound input opening is disposed at two opposite sides of the switching device or the contact terminal.

* * * * *